US012361919B2

(12) United States Patent
Feng et al.

(10) Patent No.: US 12,361,919 B2
(45) Date of Patent: Jul. 15, 2025

(54) INSTABILITY DETECTION AND ADAPTIVE-ADJUSTMENT FOR ACTIVE NOISE CANCELLATION SYSTEM

(71) Applicant: HARMAN INTERNATIONAL INDUSTRIES, INCORPORATED, Stamford, CT (US)

(72) Inventors: Tao Feng, Novi, MI (US); Kevin J. Bastyr, Franklin, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 140 days.

(21) Appl. No.: 18/278,732

(22) PCT Filed: Feb. 26, 2021

(86) PCT No.: PCT/US2021/019765
§ 371 (c)(1),
(2) Date: Aug. 24, 2023

(87) PCT Pub. No.: WO2022/182351
PCT Pub. Date: Sep. 1, 2022

(65) Prior Publication Data
US 2024/0203392 A1 Jun. 20, 2024

(51) Int. Cl.
*G10K 11/178* (2006.01)

(52) U.S. Cl.
CPC .. *G10K 11/17817* (2018.01); *G10K 11/17825* (2018.01); *G10K 11/17883* (2018.01); *G10K 2210/12821* (2013.01); *G10K 2210/3026* (2013.01); *G10K 2210/3027* (2013.01); *G10K 2210/3028* (2013.01); *G10K 2210/3044* (2013.01)

(58) Field of Classification Search
CPC ....... G10K 11/17817; G10K 11/17825; G10K 11/17883; G10K 2210/12821; G10K 2210/3026; G10K 2210/3027; G10K 2210/3028; G10K 2210/3044
USPC .......... 381/71.4
See application file for complete search history.

(56) References Cited

U.S. PATENT DOCUMENTS 10,672,378 B1 * 6/2020 Bastyr ............ G10K 11/1781
10,741,162 B1 8/2020 Bastyr et al.

FOREIGN PATENT DOCUMENTS

CN 112289295 A 1/2021
WO 2019106077 A1 6/2019

* cited by examiner

*Primary Examiner* — Vivian C Chin
*Assistant Examiner* — Douglas J Suthers
(74) *Attorney, Agent, or Firm* — BROOKS KUSHMAN P.C.

(57) ABSTRACT

An active noise cancellation (ANC) system is provided with at least one loudspeaker to project anti-noise sound within a passenger cabin of a vehicle in response to receiving an anti-noise signal and at least one microphone to provide an error signal indicative of noise and the anti-noise sound within the passenger cabin. An adaptive filter controller is programmed to filter the error signal to obtain a noise reduction ratio, and to adjust a step size and/or leakage parameter based on a comparison of the noise reduction ratio to a noise threshold. A controllable filter generates the anti-noise signal based on the adjusted step size and/or leakage parameter.

17 Claims, 7 Drawing Sheets

INSTABILITY DETECTION AND ADAPTIVE-ADJUSTMENT FOR ACTIVE NOISE CANCELLATION SYSTEM

CROSS-REFERENCE TO RELATED APPLICATION

This application is the U.S. national phase of PCT Application No. PCT/US2021/019765 filed on Feb. 26, 2021, the disclosure of which is hereby incorporated in its entirety by reference herein.

TECHNICAL FIELD

The present disclosure is directed to an active noise cancellation system and, more particularly, to adjusting filter parameters to limit noise boosting and/or system instability.

BACKGROUND

Active Noise Cancellation (ANC) systems attenuate undesired noise using feedforward and/or feedback structures to adaptively remove undesired noise within a listening environment, such as within a vehicle cabin. ANC systems generally cancel or reduce unwanted noise by generating cancellation sound waves to destructively interfere with the unwanted audible noise. Destructive interference results when noise and "anti-noise," which is largely identical in magnitude but opposite in phase to the noise, reduce the sound pressure level (SPL) at a location. In a vehicle cabin listening environment, potential sources of undesired noise come from the engine, the exhaust system, the interaction between the vehicle's tires and a road surface on which the vehicle is traveling, and/or sound radiated by the vibration of other parts of the vehicle. Therefore, unwanted noise varies with the speed, road conditions, and operating states of the vehicle.

A Road Noise Cancellation (RNC) system is a specific ANC system implemented on a vehicle in order to minimize undesirable road noise inside the vehicle cabin. RNC systems use vibration sensors to sense road induced vibration generated from the tire and road interface that leads to unwanted audible road noise. This unwanted road noise inside the cabin is then cancelled, or reduced in level, by using loudspeakers to generate sound waves that are ideally opposite in phase and identical in magnitude to the noise to be reduced at one or more listeners' ears. Cancelling such road noise results in a more pleasurable ride for vehicle passengers, and it enables vehicle manufacturers to use lightweight materials, thereby decreasing energy consumption and reducing emissions.

An Engine Order Cancellation (EOC) system is a specific ANC system implemented on a vehicle in order to minimize undesirable engine noise inside the vehicle cabin. EOC systems use a non-acoustic sensor, such as an engine speed sensor, to generate a signal representative of the engine crankshaft rotational speed in revolutions-per-minute (RPM) as a reference. This reference signal is used to generate sound waves that are opposite in phase to the engine noise that is audible in the vehicle interior. Because EOC systems use a signal from an RPM sensor, they do not require vibration sensors.

RNC systems are typically designed to cancel broadband signals, while EOC systems are designed and optimized to cancel narrowband signals, such as individual engine orders. ANC systems within a vehicle may provide both RNC and EOC technologies. Such vehicle-based ANC systems are typically Least Mean Square (LMS) adaptive feed-forward systems that continuously adapt W-filters based on noise inputs (e.g., acceleration inputs from the vibration sensors in an RNC system) and signals of physical microphones located in various positions inside the vehicle's cabin. A feature of LMS-based feed-forward ANC systems and corresponding algorithms is the storage of the impulse response, or secondary path, between each physical microphone and each anti-noise loudspeaker in the system. The secondary path is the transfer function between an anti-noise generating loudspeaker and a physical microphone, essentially characterizing how an electrical anti-noise signal becomes sound that is radiated from the loudspeaker, travels through a vehicle cabin to a physical microphone, and becomes the microphone output signal.

The remote or virtual microphone technique is a technique in which an ANC system estimates an error signal generated by an imaginary or virtual microphone at a location where no real physical microphone is located, based on the error signals received from one or more real physical microphones. This virtual microphone technique can improve noise cancellation at a listener's ears even when no physical microphone is actually located there.

ANC systems employ modeled transfer characteristics, which estimate the various secondary paths, to adapt the W-filters. Noise cancellation performance degradation, noise gain, or actual instability can result if the modeled transfer characteristic of the secondary path stored in the ANC system differs from the actual secondary path within the vehicle. The actual secondary path may deviate from the stored secondary path model, typically measured on a "golden system" by trained engineers, when a vehicle becomes substantially different from the reference vehicle or system in terms of geometry, passenger count, luggage loading, or the like. Other differences could include or loudspeaker or microphone unit-to-unit variation, aging or failure, microphone or speaker blocking, non-identical loudspeaker replacement or wiring errors.

SUMMARY

In one embodiment, an active noise cancellation (ANC) system is provided with at least one loudspeaker to project anti-noise sound within a passenger cabin of a vehicle in response to receiving an anti-noise signal and at least one microphone to provide an error signal indicative of noise and the anti-noise sound within the passenger cabin. An adaptive filter controller is programmed to filter the error signal to obtain a noise reduction ratio, and to adjust a step size parameter based on a comparison of the noise reduction ratio to a noise threshold. A controllable filter generates the anti-noise signal based on the adjusted step size parameter.

In another embodiment, an active noise cancellation (ANC) system is provided with at least one loudspeaker to project anti-noise sound within a passenger cabin of a vehicle in response to receiving an anti-noise signal. A controller is configured to: filter an error signal indicative of noise and the anti-noise sound within the passenger cabin to obtain a noise reduction ratio, adjust a step size parameter and a leakage parameter based on a comparison of the noise reduction ratio to a noise threshold, and generate the anti-noise signal based on the adjusted step size parameter and the adjusted leakage parameter.

In yet another embodiment a method is provided for controlling stability in an active noise cancellation (ANC) system. An error signal is received from a microphone that is indicative of noise and anti-noise sound within a passenger cabin. The error signal is filtered to obtain a noise reduction ratio. An occurrence of noise boosting is detected based on a comparison of the noise reduction ratio to a noise threshold. A step size parameter is decreased in response to detection of noise boosting. An anti-noise signal, to be radiated from a loudspeaker within the passenger cabin as the anti-noise sound, is generated based on the decreased step size parameter.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis.

Figure 1:
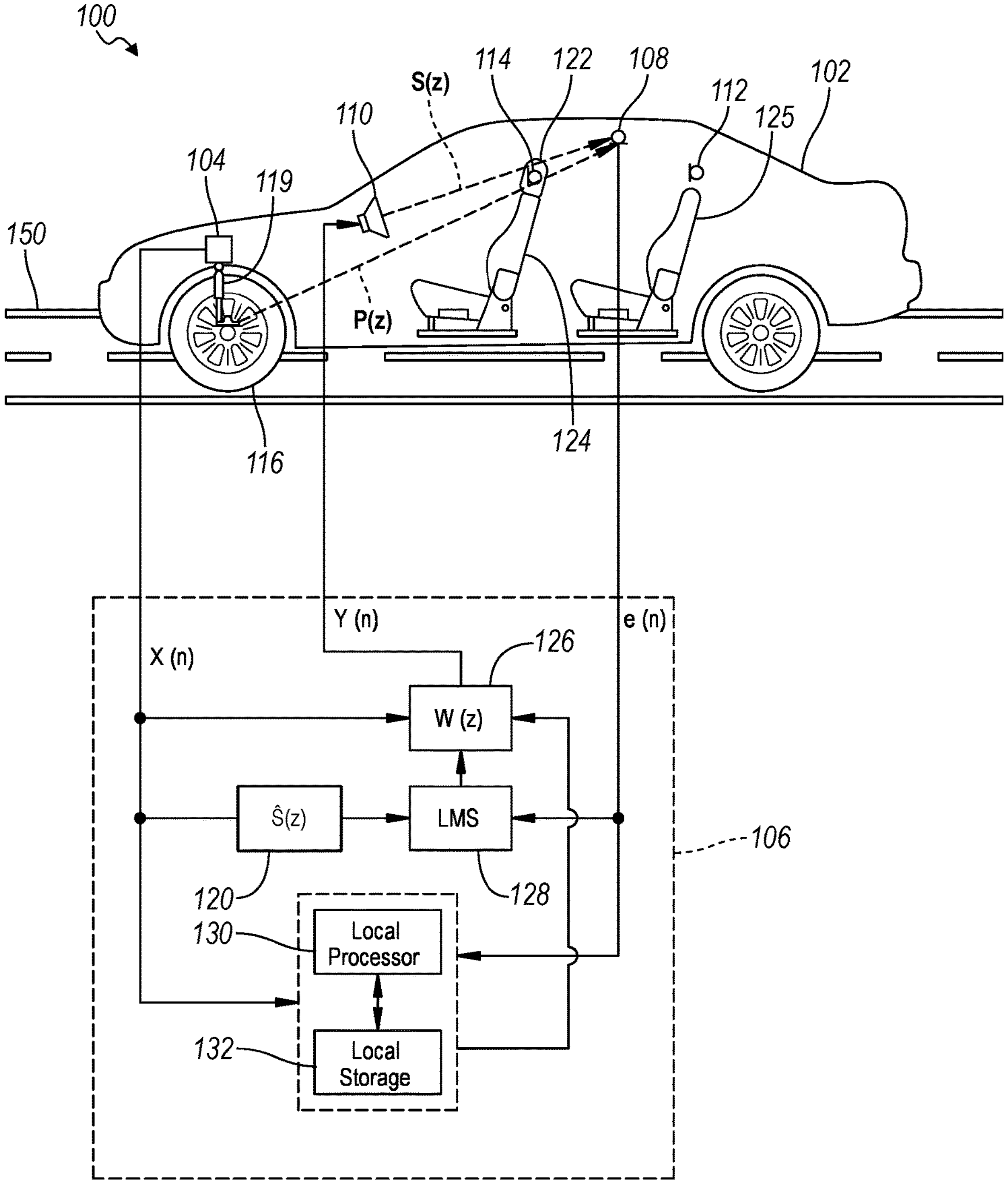
FIG. 1 is a schematic diagram of a vehicle having an active noise cancellation (ANC) system including a road noise cancellation (RNC) and a virtual microphone, in accordance with one or more embodiments.

With reference to FIG. 1, a road noise cancellation (RNC) system is illustrated in accordance with one or more embodiments and generally represented by numeral 100. The RNC system 100 is depicted within a vehicle 102 having one or more vibration sensors 104. The vibration sensors 104 are disposed throughout the vehicle 102 to monitor the vibratory behavior of the vehicle's suspension, subframe, as well as other axle and chassis components. The RNC system 100 may be integrated with a broadband adaptive feed-forward active noise cancellation (ANC) system 106 that generates anti-noise by adaptively filtering the signals from the vibration sensors 104 using one or more physical microphones 108. The ANC system 106 evaluates the signals and adaptively adjusts one or more LMS adaptation parameters, such as step size and leakage, based on instability detection to limit or eliminate noise boosting in the affected frequency ranges. The anti-noise signal may then be played through one or more loudspeakers 110 to become sound. S(z) represents a transfer function between a single loudspeaker 110 and a single microphone 108.

While FIG. 1 shows a single vibration sensor 104, microphone 108, and loudspeaker 110 for simplicity purposes only, it should be noted that typical RNC systems use multiple vibration sensors 104 (e.g., ten or more), microphones 108 (e.g., four to six), and loudspeakers 110 (e.g., four to eight). The ANC system 106 may also include one or more virtual microphones 112, 114 that are used for adapting anti-noise signal(s) that are optimized for the occupants in the vehicle 102, according to one or more embodiments.

The vibration sensors 104 may include, but are not limited to, accelerometers, force gauges, geophones, linear variable differential transformers, strain gauges, and load cells. Accelerometers, for example, are devices whose output signal amplitude is proportional to acceleration. A wide variety of accelerometers are available for use in RNC systems. These include accelerometers that are sensitive to vibration in one, two and three typically orthogonal directions. These multi-axis accelerometers typically have a separate electrical output (or channel) for vibration sensed in their X-direction, Y-direction and Z-direction. Single-axis and multi-axis accelerometers, therefore, may be used as vibration sensors 104 to detect the magnitude and phase of acceleration and may also be used to sense orientation, motion, and vibration.

Noise and vibration that originates from a wheel 116 moving on a road surface 118 may be sensed by one or more of the vibration sensors 104 mechanically coupled to a suspension device 119 or a chassis component of the vehicle 102. The vibration sensor 104 may output a noise signal X(n), which is a vibration signal that represents the detected road-induced vibration. It should be noted that multiple vibration sensors are possible, and their signals may be used separately, or may be combined. In certain embodiments, a microphone may be used in place of a vibration sensor to output the noise signal X(n) indicative of noise generated from the interaction of the wheel 116 and the road surface 118. The noise signal X(n) may be filtered with a modeled transfer characteristic $\hat{S}(z)$, which estimates the secondary path (i.e., the transfer function between an anti-noise loudspeaker 110 and a physical microphone 108), by a secondary path filter 120.

Road noise that originates from the interaction of the wheel 116 and the road surface 118 is also transferred, mechanically and/or acoustically, into the passenger cabin and is received by the one or more microphones 108 inside the vehicle 102. The one or more microphones 108 may, for example, be located in a headliner of the vehicle 102, or in some other suitable location to sense the acoustic noise field heard by occupants inside the vehicle 102, such as an occupant sitting on a rear seat 125. The road noise originating from the interaction of the road surface 118 and the wheel 116 is transferred to the microphone 108 according to a transfer characteristic P(z), which represents the primary path (i.e., the transfer function between an actual noise source and a physical microphone).

The microphone 108 may output an error signal e(n) representing the sound present in the cabin of the vehicle 102 as detected by the microphone 108, including noise and anti-noise. In the RNC system 100, an adaptive transfer characteristic W(z) of a controllable filter 126 may be controlled by adaptive filter controller 128, which may operate according to a known least mean square (LMS) algorithm based on the error signal e(n) and the noise signal X(n) filtered with the modeled transfer characteristic $\hat{S}(z)$ by the secondary path filter 120. The controllable filter 126 is often referred to as a W-filter. An anti-noise signal Y(n) may be generated by the controllable filter or filters 126 and the vibration signal, or a combination of vibration signals X(n). The anti-noise signal Y(n) ideally has a waveform such that when played through the loudspeaker 110, anti-noise is generated near the occupants' ears and the microphone 108, that is substantially opposite in phase and identical in magnitude to that of the road noise audible to the occupants of the vehicle cabin. The anti-noise from the loudspeaker 110 may combine with road noise in the vehicle cabin near the microphone 108 resulting in a reduction of road noise-induced sound pressure levels (SPL) at this location. In certain embodiments, the RNC system 100 may receive sensor signals from other acoustic sensors in the passenger cabin, such as an acoustic energy sensor, an acoustic intensity sensor, or an acoustic particle velocity or acceleration sensor to generate error signal e(n).

The simplified RNC system schematic depicted in FIG. 1 shows one secondary path, represented by S(z), between the loudspeaker 110 and the microphone 108. As previously mentioned, RNC systems typically have multiple loudspeakers, microphones and vibration sensors. Accordingly, a six-speaker, six-microphone RNC system will have thirty-six total secondary paths (i.e., 6×6). Correspondingly, the six-speaker, six-microphone RNC system may likewise have thirty-six $\hat{S}(z)$ litters (i.e., secondary path filters 120), which estimate the transfer function for each secondary path. As shown in FIG. 1, an RNC system will also have one W(z) filter (i.e., controllable filter 126) between each noise signal X(n) from a vibration sensor (i.e., accelerometer) 104 and each loudspeaker 110. Accordingly, a twelve-accelerometer signal, six-speaker RNC system may have seventy-two W(z) filters. The relationship between the number of accelerometer signals, loudspeakers, and W(z) filters is illustrated in FIG. 2.

Figure 2:
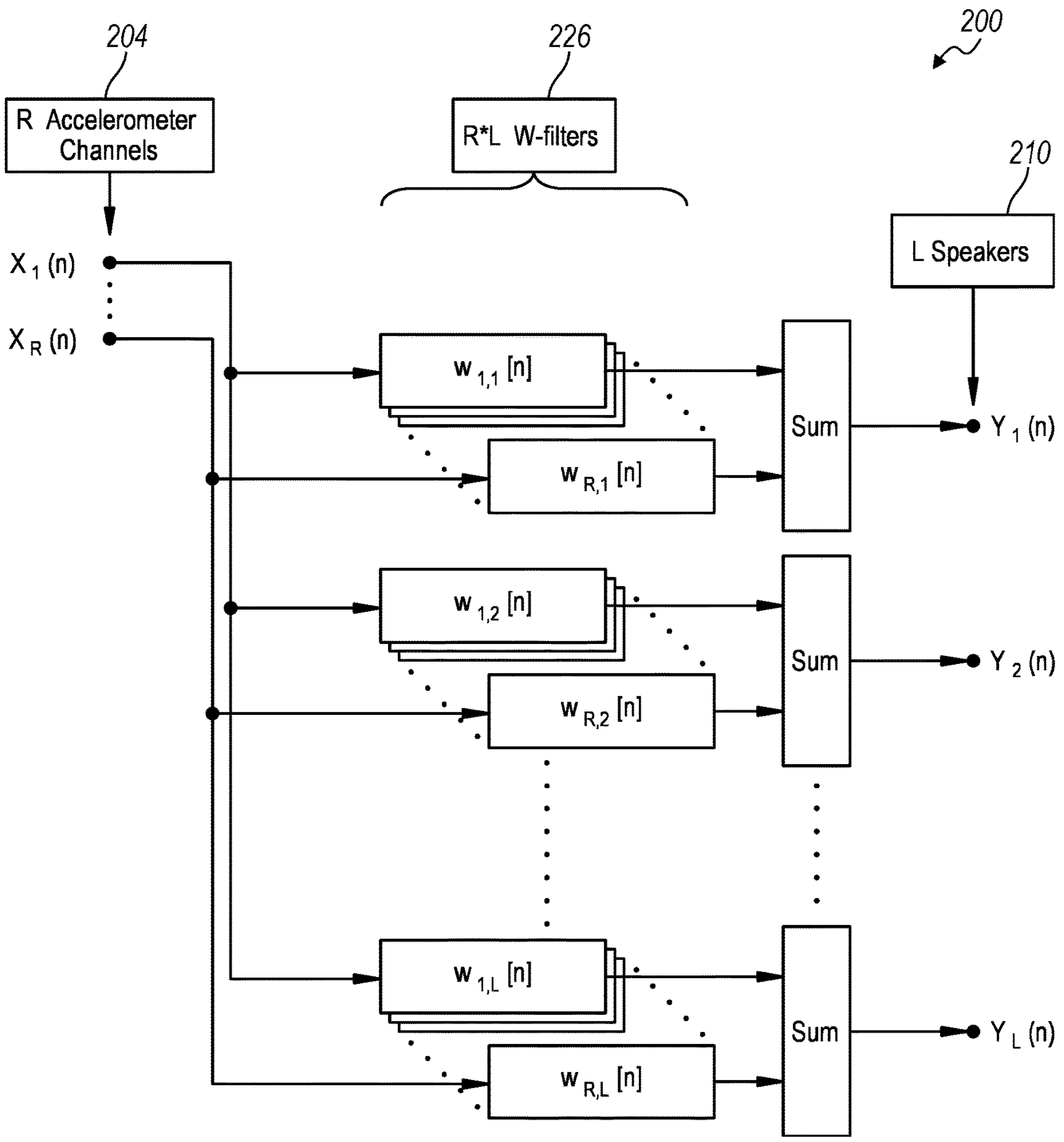
FIG. 2 is a sample schematic diagram demonstrating relevant portions of an RNC system scaled to include R accelerometer signals and L loudspeaker signals.

FIG. 2 is a sample schematic diagram demonstrating relevant portions of an RNC system 200 scaled to include R accelerometer signals [$X_1$(n), $X_2$(n), . . . $X_R$(n)] from accelerometers 204 and L loudspeaker signals [$Y_1$(n), $Y_2$(n), . . . $Y_L$(n)] from loudspeakers 210. Accordingly, the RNC system 200 may include R*L controllable filters (or W-filters) 226 between each of the accelerometer signals and each of the loudspeakers. As an example, an RNC system having twelve accelerometer outputs (i.e., R=12) may employ six dual-axis accelerometers or four triaxial accelerometers. In the same example, a vehicle having six loudspeakers (i.e., L=6) for reproducing anti-noise, therefore, may use seventy-two W-filters in total. At each of the L loudspeakers, R W-filter outputs are summed to produce the loudspeaker's anti-noise signal Y(n). Each of the L loudspeakers may include an amplifier (not shown). In one or more embodiments, the R accelerometer signals filtered by the R W-filters are summed to create an electrical anti-noise signal y(n), which is fed to the amplifier to generate an amplified anti-noise signal Y(n) that is sent to a loudspeaker.

The ANC system 106 illustrated in FIG. 1 may also include an engine order cancellation (EOC) system. As mentioned above, EOC technology uses a non-acoustic signal such as an engine speed signal representative of the engine crankshaft rotational speed as a reference in order to generate sound that is opposite in phase to the engine noise audible in the vehicle interior. EOC systems may utilize a narrowband feed-forward ANC framework to generate anti-noise using an engine speed signal to guide the generation of an engine order signal identical in frequency to the engine order to be cancelled, and adaptively filtering it to create an anti-noise signal. After being transmitted via a secondary path from an anti-noise source to a listening position or physical microphone, the anti-noise ideally has the same amplitude, but opposite phase, as the combined sound generated by the engine and exhaust pipes after being filtered by the primary paths that extend from the engine to the listening position and from the exhaust pipe outlet to the listening position or physical or virtual microphone position. Thus, at the place where a physical microphone resides in the vehicle cabin (i.e., most likely at or close to the listening position), the superposition of engine order noise and anti-noise would ideally become zero so that acoustic error signal received by the physical microphone would only record sound other than the (ideally cancelled) engine order or orders generated by the engine and exhaust.

Commonly, a non-acoustic sensor, for example an engine speed sensor, is used as a reference. Engine speed sensors may be, for example, Hall Effect sensors which are placed adjacent to a spinning steel disk. Other detection principles can be employed, such as optical sensors or inductive sensors. The signal from the engine speed sensor can be used as a guiding signal for generating an arbitrary number of reference engine order signals corresponding to each of the engine orders. The reference engine orders form the basis for noise cancelling signals generated by the one or more narrowband adaptive feed-forward LMS blocks that form the EOC system.

Figure 3:
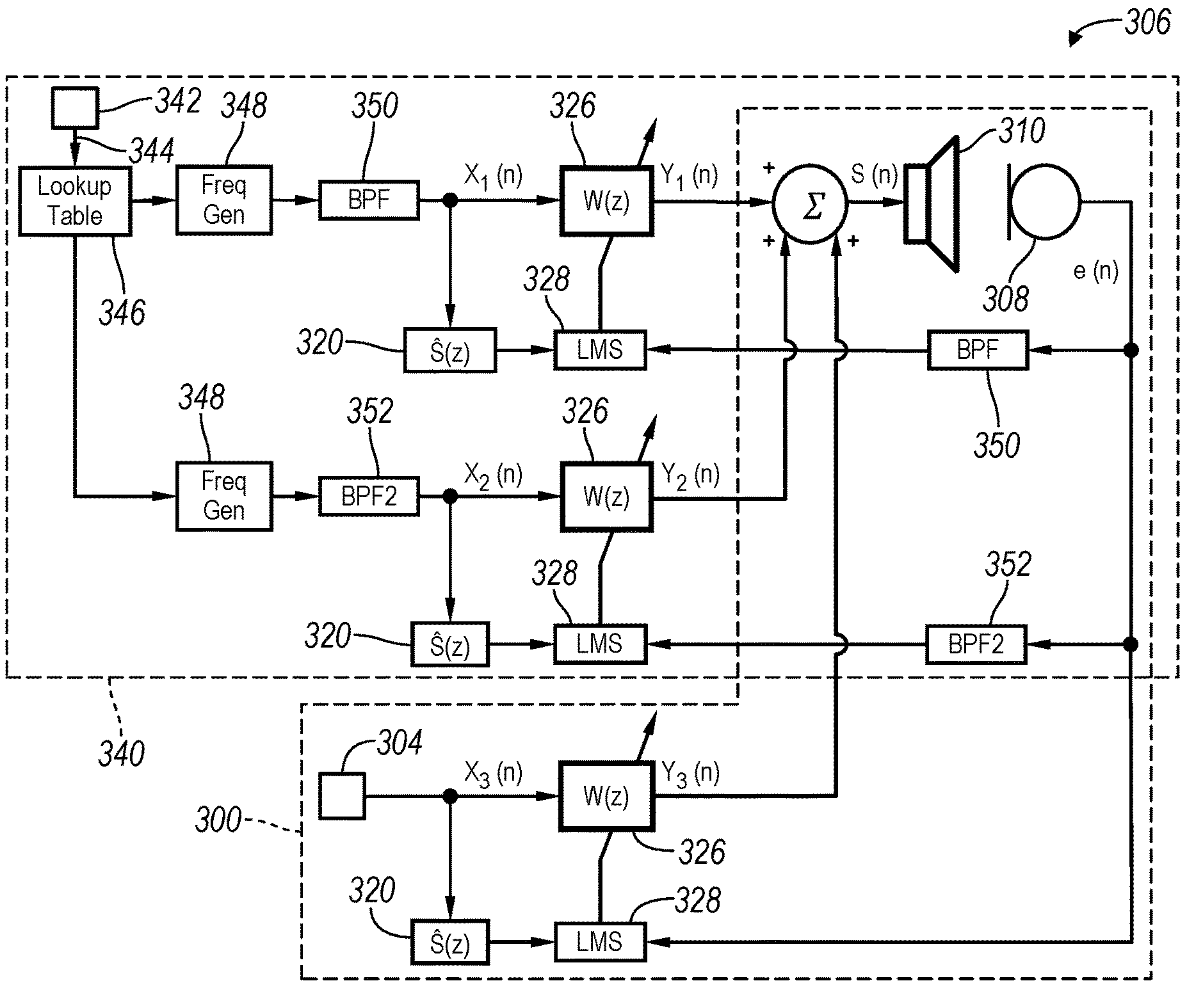
FIG. 3 is a sample schematic block diagram of an ANC system including an engine order cancellation (EOC) system and an RNC system.

FIG. 3 is a schematic block diagram illustrating an example of an ANC system 306, including both an RNC system 300 and an EOC system 340. Similar to RNC system 100, the RNC system 300 may include a vibration sensor 304, physical microphone 308, w-filter 326, adaptive filter controller 328, secondary path filter 320, and loudspeaker 310, consistent with operation of the vibration sensor 104, physical microphone 108, w-filter 126, adaptive filter controller 128, secondary path filter 120, and loudspeaker 110, respectively, discussed above.

The EOC system 340 may include an engine speed sensor 342, which may provide an engine speed signal 344 (e.g., a square-wave signal) indicative of rotation of an engine crank shaft or other rotating shaft such as the drive shaft, half shafts or other shafts whose rotational rate is aligned with vibrations coupled to vehicle components that lead to noise in the passenger cabin. In some embodiments, the engine speed signal 344 may be obtained from a vehicle network bus (not shown). As the radiated engine orders are directly proportional to the crank shaft RPM, the engine speed signal 344 is representative of the frequencies produced by the engine and exhaust system. Thus, the signal from the engine speed sensor 342 may be used to generate reference engine order signals corresponding to each of the engine orders for the vehicle. Accordingly, the engine speed signal 344 may be used in conjunction with a lookup table 346 of Engine Speed (RPM) vs. Engine Order Frequency, which provides a list of engine orders radiated at each engine speed. The frequency generator 348 may take as an input the Engine Speed (RPM) and generate a sine wave for each order based on this lookup table 346.

The frequency of a given engine order at the sensed Engine Speed (RPM), as retrieved from the lookup table 346, may be supplied to a frequency generator 348, thereby generating a sine wave at the given frequency. This sine wave represents a noise signal X(n) indicative of engine order noise for a given engine order. Similar to the RNC system 300, this noise signal X(n) from the frequency generator 348 may be sent to an adaptive controllable filter 326, or W-filter, which provides a corresponding anti-noise signal Y(n) to the loudspeaker 310. As shown, various components of this narrow-band, EOC system 340 may be identical to the broadband RNC system 300, including the physical microphone 308, adaptive filter controller 328 and secondary path filter 320. The anti-noise signal Y(n), broadcast by the loudspeaker 310 generates anti-noise that is substantially out of phase but identical in magnitude to the actual engine order noise at the location of a listener's ear, which may be in close proximity to a physical microphone 308, thereby reducing the sound amplitude of the engine order. Because engine order noise is narrow band, the error signal e(n) may be filtered by a bandpass filter 350 prior to passing into the LMS-based adaptive filter controller 328. In an embodiment, proper operation of the LMS adaptive filter controller 328 is achieved when the noise signal X(n) output by the frequency generator 348 is bandpass filtered using the same bandpass filter parameters.

In order to simultaneously reduce the amplitude of multiple engine orders, the EOC system 340 may include multiple frequency generators 348 for generating a noise signal X(n) for each engine order based on the Engine Speed (RPM) signal 344. As an example, FIG. 3 shows a two order EOC system having two such frequency generators for generating a unique noise signal (e.g., $X_1(n)$, $X_2(n)$, etc.) for each engine order based on engine speed. Because the frequency of the two engine orders differ, the bandpass filters 350 (labeled BPF and BPF2) have different high- and low-pass filter corner frequencies. The number of frequency generators and corresponding noise-cancellation components will vary based on the number of engine orders to be cancelled for a particular engine of the vehicle. As the two-order EOC system 340 is combined with the RNC system 300 to form the ANC system 306, the anti-noise signals Y(n) output from the three controllable filters 326 are summed and sent to the loudspeaker 310 as a loudspeaker signal S(n). Similarly, the error signal e(n) from the physical microphone 308 may be sent to the three LMS adaptive filter controllers 328.

Noise cancellation performance degradation, noise gain, or actual instability may result if the modeled transfer characteristic $\hat{S}(z)$, representing an estimate of the secondary path, that is stored in the ANC system does not match the actual secondary path of the system. As previously discussed, the secondary path is the transfer function between an anti-noise generating loudspeaker and a physical microphone. Accordingly, it essentially characterizes how the electrical anti-noise signal Y(n) becomes sound that is radiated from the loudspeaker, travels through the car cabin to the physical microphone, and becomes part of the microphone output or error signal e(n) in the ANC system. The actual secondary path S(z) may deviate from the stored secondary path model $\hat{S}(z)$, which is typically measured on a "golden system" by trained engineers, when a vehicle becomes substantially different from the reference vehicle or system in terms of geometry, passenger count, luggage loading, or the like.

Figure 4:
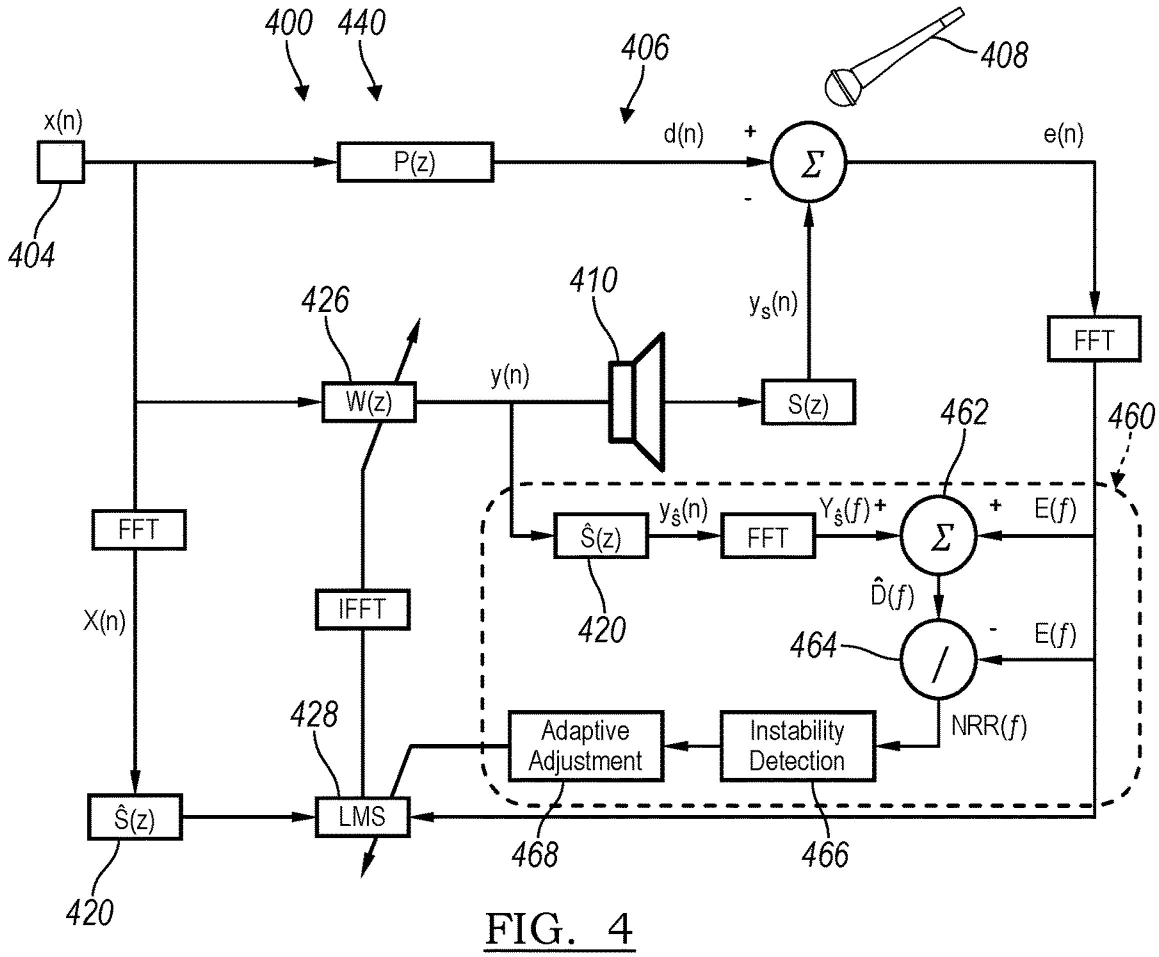
FIG. 4 is a schematic block diagram representing an ANC system including a signal analysis controller, in accordance with one or more embodiments of the present disclosure.

FIG. 4 is a schematic block diagram of a vehicle-based ANC system 406 showing many of the key ANC system parameters that may be used to adapt or adjust w-filter parameters, such as step size and/or leakage, in response to detecting instability or boosting in one or more error microphone signals to limit or eliminate noise boosting in the affected frequency ranges. For ease of explanation, the ANC system 406 illustrated in FIG. 4 is shown with components and features of an RNC system 400 and an EOC system 440. Accordingly, the ANC system 406 is a schematic representation of an RNC and/or EOC system, such as those described in connection with FIGS. 1-3, featuring additional system components of the ANC system 406 including an additional signal processing block 460 integrated into the error microphone signal path. Similar components may be numbered using a similar convention.

For instance, similar to ANC system 106, the ANC system 406 may include an accelerometer or vibration sensor 404, a physical microphone 408, a w-filter 426, an adaptive filter controller 428, a secondary path filter 420, and a loudspeaker 410, consistent with operation of the vibration sensor 104, the physical microphone 108, the w-filter 126, the adaptive filter controller 128, the secondary path filter 120, and the loudspeaker 110, respectively, discussed above. FIG. 4 also shows the primary path P(z), the secondary path S(z), fast Fourier transform (FFT) blocks for converting signals to the frequency domain, and an inverse FFT (IFFT) block for converting signals to the time domain, in block form for illustrative purposes.

The ANC system 406 estimates a noise reduction ratio NRR(f) in the frequency domain in signal processing block 460. The ANC system 406 filters the anti-noise signal y(n) by an estimated secondary path $\hat{S}(z)$, where n is the sample number, to generate an estimated anti-noise signal $y_{\hat{s}}$=(n), as shown in Equation 1:

$$y_{\hat{s}}(n)=y(n)*\hat{S}(z) \quad (1)$$

The ANC system 406 converts the estimated anti-noise signal $y_{\hat{s}}(n)$ to the frequency domain using an FFT to provide $Y_{\hat{s}}(f)$. The ANC system 406 then combines $Y_{\hat{s}}(f)$ with the error signal E(f) at block 462 to provide an estimated noise at each microphone $\hat{D}(f)$, as shown in Equation 2:

$$\hat{D}(f)=Y_{\hat{s}}(f)+E(f) \quad (2)$$

The ANC system 406 then calculates the noise reduction ratio NRR(f) by subtracting the estimated error signal E(f) from the estimated noise at each microphone $\hat{D}(f)$ at block 464, as shown in Equation 3:

$$\mathrm{NRR}(f)=\hat{D}(f)/E(f) \quad (3)$$

At block 466, the ANC system 406 evaluates the noise reduction ratio NRR(f) to determine if the system is boosting the noise level, rather than decreasing it. The ANC system 406 may detect noise boosting, or instability by comparing NRR(f) to a noise threshold. At block 468, the ANC system 406 adaptively adjusts one or more adaptive filter controller parameters, such as step size and leakage, based on the instability detection. There are three different modes for adaptively adjusting the adaptive filter controller parameters: 1) Normal Mode, where the parameter remains unchanged; 2) Attack Mode, where the parameter is decreased to maintain system stability; and 3) Release Mode, where the parameter is increased to maintain system performance. Then the adaptive filter controller 428 controls the w-filter 426 adaptation based on the adjusted w-filter parameters.

Figure 5:
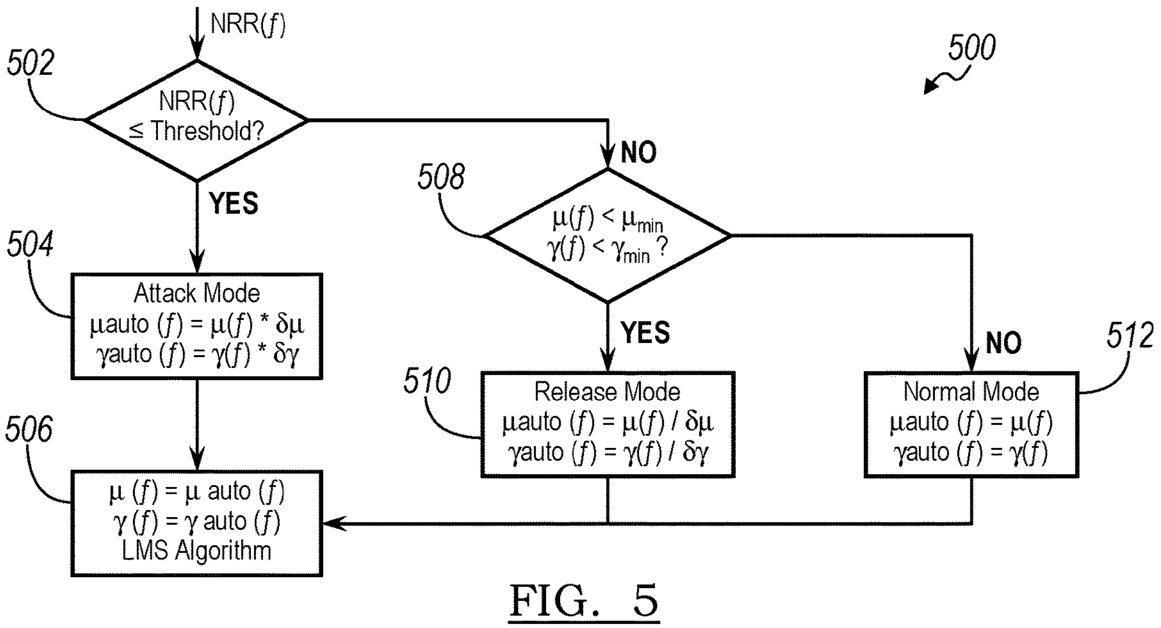
FIG. 5 is a flowchart depicting a method for adjusting filter parameters in an ANC system, in accordance with one or more embodiments.

FIG. 5 is a flowchart depicting a method 500 for adjusting adaptive filter controller parameters based on ANC system instability, in accordance with one or more embodiments of the present disclosure. Various steps of the disclosed method may be carried out by the adaptive filter controller 428 either alone, or in combination with other components of the ANC system 406.

At step 502, the ANC system 406 compares the frequency dependent noise reduction ratio NRR(f) to a frequency dependent noise threshold value to determine if the system is boosting noise at any frequency. In one or more embodiments, the noise threshold is equal to one, and values of NRR(f) that are less than one, indicate an undesirable increase in the noise level, which is noise boosting. If the ANC system 406 determines that NRR(f) is less than or equal to the noise threshold, which indicates noise boosting at a frequency or in a frequency range, the ANC system 406 proceeds to step 504 and adaptively adjusts an automatic tuning step size parameter $\mu_{auto}(f)$ and/or an automatic tuning leakage parameter $\gamma_{auto}(f)$ according to the Attack Mode. These parameters $\mu_{auto}(f)$ and $\gamma_{auto}(f)$, are the parameters that the algorithm automatically adjusts to reduce the noise boosting at a frequency or frequencies. Then at step 506, the adaptive filter controller 428 controls the w-filter 426 based on the Attack Mode adjusted w-filter adaptation parameters $\mu_{auto}(f)$ and $\gamma_{auto}(f)$, which are assigned back to $\mu(f)$ and $\gamma(f)$ for the adaptive filter controller 428 to use. In an embodiment, the NRR(f) has the same value at all frequencies.

If the ANC system 406 determines that the frequency dependent noise reduction ratio NRR(f) is greater than the predetermined frequency dependent noise threshold value at step 502, which indicates that there is no noise boosting, it proceeds to step 508 and compares an automatic tuning step size parameter $\mu_{auto}(f)$ to the minimum step size parameter $\mu_{min}$, and/or an automatic tuning leakage parameter $\gamma_{auto}(f)$ to the minimum leakage parameter $\gamma_{min}$. The minimum step size parameter $\mu_{min}$ and the minimum leakage parameter $\gamma_{min}$ define the minimum values of the automatic tuning step size parameter $\mu_{auto}(f)$ and the automatic tuning leakage parameter $\gamma_{auto}(f)$.

If $\mu_{auto}(f)$ is less than $\mu_{min}(f)$, or if $\gamma_{auto}(f)$ is less than $\gamma_{min}(f)$, the ANC system 406 proceeds to step 510 and adaptively adjusts a step size parameter and/or a leakage parameter according to the Release Mode. Then at step 506, the adaptive filter controller 428 controls the w-filter 426 based on the Release Mode adjusted adaptation parameters $\gamma_{auto}(f)$ and $\mu_{auto}(f)$ which are assigned back to $\gamma(f)$ and $\mu(f)$ for the adaptive filter controller 428 to use in updating the w-filter 426. In an embodiment, the noise threshold has the same value at every frequency. In an embodiment, $\mu_{min}(f)$ equals the predetermined, original value of $\mu(f)$ that is stored in system memory; and used when the ANC system 406 was powered on. In an embodiment, $\gamma_{min}(f)$ equals the predetermined, original value of $\mu(f)$ that is stored in system memory; and used when the ANC system 406 was powered on.

If the ANC system 406 determines that the automatic tuning step size parameter $\mu_{auto}(f)$ or the automatic leakage parameter $\gamma_{auto}(f)$ is greater than or equal to the corresponding minimum step size parameter $\mu_{min}(f)$ or minimum leakage parameter $\gamma_{min}(f)$ at step 508, the ANC system 406 proceeds to step 512 and adaptively adjusts a step size parameter and/or a leakage parameter according to the Normal Mode. That is, $\mu_{auto}(f)$ is set to $\mu(f)$ again, and $\gamma_{auto}(f)$ is set to $\gamma(f)$. Then at step 506, the adaptive filter controller 428 controls the w-filter 426 based on the Normal Mode adjusted w-filter parameters.

In one or more embodiments, the ANC system 406 adaptively adjusts the step size parameter $\mu(f)$ and the leakage parameter $\gamma(f)$ at different frequencies or modes. For example, in one embodiment, the ANC system 406 adaptively adjusts the step size parameter $\mu(f)$ at frequencies above 500 Hz, and adaptively adjusts the leakage parameter $\gamma(f)$ at frequencies below 500 Hz. In another embodiment, the ANC system 406 adaptively adjusts the step size parameter $\mu(f)$ in the Attack Mode, and adaptively adjusts the leakage parameter $\gamma(f)$ in the Release Mode.

In one embodiment, the ANC system 406 performs the method 500 by adaptively adjusting the step size parameter $\mu(f)$, but not the leakage parameter $\gamma(f)$. The adaptive filter controller 408 calculates an updated W-filter parameter (W(f, n+1)) based on a W-filter parameter at a frequency value (W(f, n)), the leakage parameter ($\gamma(f)$), the filtered reference accelerometer signal (Fx(f, n)), the estimated error signal (E(f, n)), and the updated step size parameter $\mu(f)$, which is based on an automatic tuning step size parameter, according to Equation (4):

$$W(f,n+1)=W(f,n)*\gamma(f)+\mu(f)*Fx(f,n)*E(f,n) \tag{4}$$

In this step size parameter adjustment embodiment, the ANC system 406 calculates the new automatic tuning step size parameter ($\mu_{auto}(f)$) at step 504 (Attack Mode), based on the current step size ($\mu(f)$) and an automatic step size tuning factor ($\delta_\mu$) according to Equation 5. In an embodiment, a predetermined value for $\delta_\mu$ is 0.99.

$$\mu_{auto}(f)=\mu(f)*\delta_\mu \tag{5}$$

At step 510 (Release Mode), in this step size parameter adjustment embodiment, the ANC system 406 calculates the automatic tuning step size parameter ($\mu_{auto}(f)$), based on the step size ($\mu(f)$) and the automatic step size tuning factor ($\delta_\mu$) according to Equation 6:

$$\mu_{auto}(f)=\mu(f)/\delta_\mu \tag{6}$$

At step 512 (Normal Mode), in this step size parameter adjustment embodiment, the ANC system 406 calculates the automatic tuning step size parameter ($\mu_{auto}(f)$), based on the previous step size parameter ($\mu(f)$) according to Equation 7:

$$\mu_{auto}(f)=\mu(f) \tag{7}$$

In another embodiment, the ANC system 406 performs the method 500 by adaptively adjusting the leakage parameter $\gamma(f)$, but not the step size parameter $\mu(f)$. The ANC system 406 calculates the updated W-filter parameter (W(f, n+1)) based on a W-filter parameter at a frequency value (W(f, n)), the step size parameter ($\mu(f)$), the filtered reference accelerometer signal (Fx(f, n)), the estimated error signal (E(f, n)), and the updated tuning leakage parameter $\gamma(f)$, which is based on an automatic turning leakage parameter, according to Equation (8):

$$W(f,n+1)=W(f,n)*\gamma(f)+\mu(f)*Fx(f,n)*E(f,n) \tag{8}$$

In this leakage parameter adjustment embodiment, the ANC system 406 calculates the automatic tuning leakage parameter ($\gamma_{auto}(f, n)$) at step 504 (Attack Mode), based on the leakage parameter ($\gamma(f)$) and an automatic leakage tuning factor ($\delta_\gamma$) according to Equation 9. In an embodiment, a predetermined value for $\delta_\gamma$ is 0.99. In another embodiment, the W(f, n)*γ(f) portion of equation 8 can be substituted for W(f, n)*(1−μ(f))γ(f), in which case $\delta_\gamma$ is 1.01, and the logical comparison in step 508 also substitutes greater than (>) for less than (<).

$$\gamma_{auto}(f)=\gamma(f)*\delta_\gamma \tag{9}$$

At step 510 (Release Mode), in this leakage parameter adjustment embodiment, the ANC system 406 calculates the automatic tuning leakage parameter ($\gamma_{auto}(f)$), based on the leakage parameter ($\gamma(f)$) and the automatic leakage tuning factor ($\delta_\gamma$) according to Equation 10:

$$\gamma_{auto}(f)=\gamma(f)/\delta_\gamma \tag{10}$$

At step 512 (Normal Mode), in this leakage parameter adjustment embodiment, the ANC system 406 calculates the automatic tuning leakage parameter ($\gamma_{auto}$(f)), based on the previous leakage parameter (γ(f)) according to Equation 11:

$$\gamma_{auto}(f)=\gamma(f) \tag{11}$$

In another embodiment, the ANC system 406 performs the method 500 by adaptively adjusting the step size parameter μ(f) and the leakage parameter γ(f). The ANC system 406 calculates an updated W-filter parameter (W(f, n+1)) based on a W-filter parameter at a frequency value (W(f, n)), the updated leakage γ(f) based on the automatic tuning leakage parameter, the updated step size μ(f) based on the automatic tuning step size parameter, the filtered reference accelerometer signal (Fx(f, n)), and the estimated error signal (E(f, n)) according to Equation 12:

$$W(f,n+1)=W(f,n)*\gamma(f)+\mu(f)*Fx(f,n)*E(f,n) \tag{12}$$

In this step size parameter and leakage parameter adjustment embodiment, at step 504 (Attack Mode), the ANC system 406 calculates the automatic tuning step size parameter ($\mu_{auto}$(f)), based on the step size parameter (μ(f)) and the automatic step size tuning factor ($\delta_\mu$) according to Equation 5. The ANC system 406 also calculates the automatic tuning leakage parameter ($\gamma_{auto}$(f)) based on the leakage parameter (γ(f)) and an automatic leakage tuning factor ($\delta_\gamma$) according to Equation 9.

At step 510 (Release Mode), in this step size parameter and leakage parameter adjustment embodiment, the ANC system 406 calculates the automatic tuning step size parameter ($\mu_{auto}$(f)), based on the step size parameter (μ(f)) and the automatic step size tuning factor ($\delta_\mu$) according to Equation 6. The ANC system 406 also calculates the automatic tuning leakage parameter ($\gamma_{auto}$(f)), based on the step size parameter (γ(f)) and the automatic leakage tuning factor ($\delta_\gamma$) according to Equation 10.

At step 512 (Normal Mode), in this step size parameter and leakage parameter adjustment embodiment, the ANC system 406 calculates the automatic tuning step size parameter ($\mu_{auto}$(f)), based on the step size parameter (μ(f)) according to Equation 7. The ANC system 406 also calculates the automatic tuning leakage parameter ($\gamma_{auto}$(f)), based on the leakage parameter (γ(f)) according to Equation 11.

In an embodiment, $\delta_\gamma$ and/or $\delta_\mu$ are predetermined values stored in a look up table. In another embodiment, $\delta_\gamma$ and/or $\delta_\mu$ are values determined by nominal values stored in a look up table scaled by the NRR(f) value in a predetermined way. In another embodiment, $\delta_\mu$ is scaled first, and once the value reaches a predetermined noise threshold, then the value of $\delta_\gamma$ is scaled from unity in a predetermined way. In an embodiment, $\delta_\gamma$ and/or $\delta_\mu$ are frequency dependent. Other methods to scale these two variables are possible. Other embodiments include a simplified version of the method 500 of FIG. 5 that includes the Attack Mode alone, or the Attack Mode with one of the Release Mode and the Normal Mode.

Figure 6:
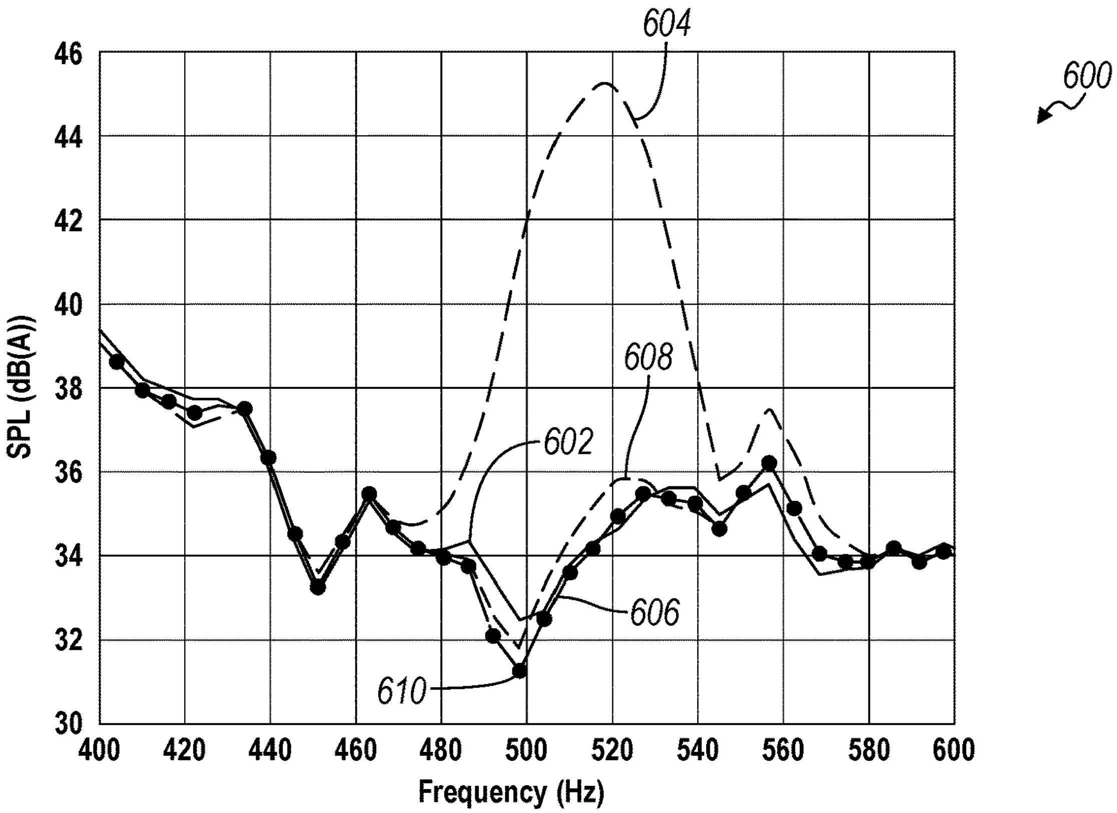
FIG. 6 is a graph illustrating a frequency response resulting from the added sound generated by the ANC system of FIG. 4 according to the method of FIG. 5.
Figure 7:
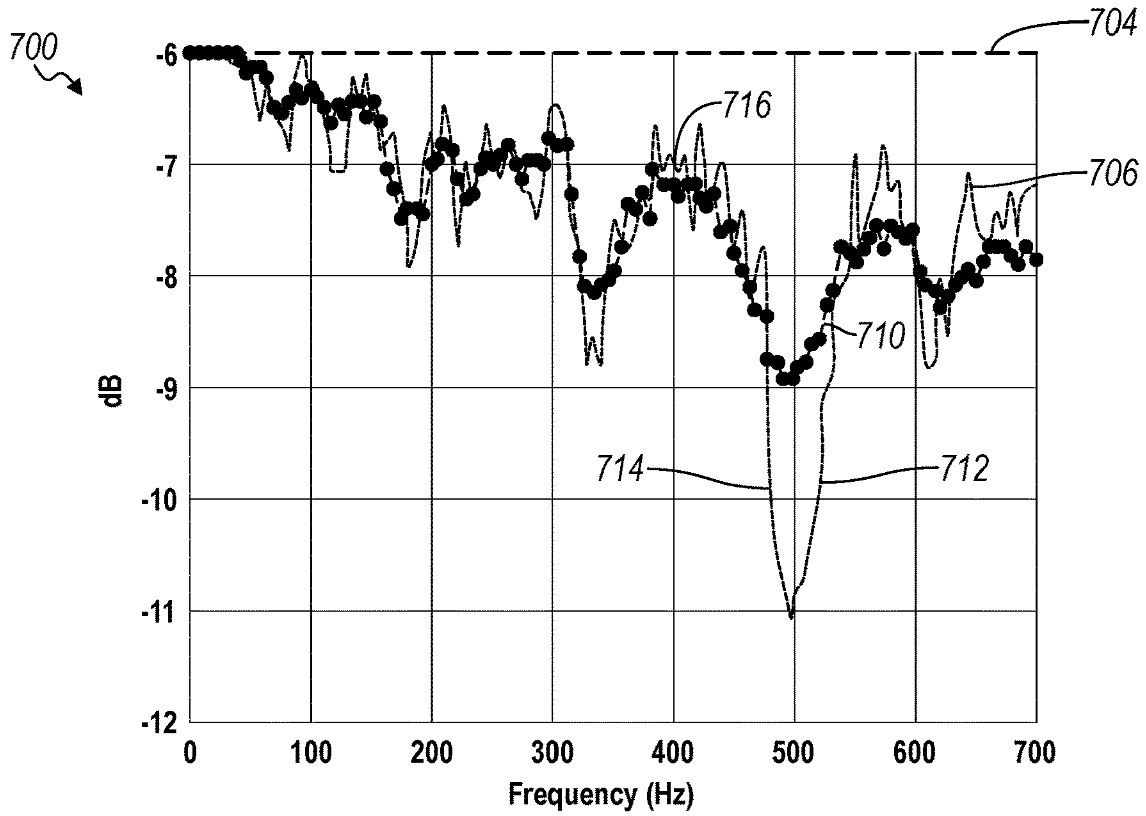
FIG. 7 is a graph further illustrating the frequency response of FIG. 6.
Figure 8:
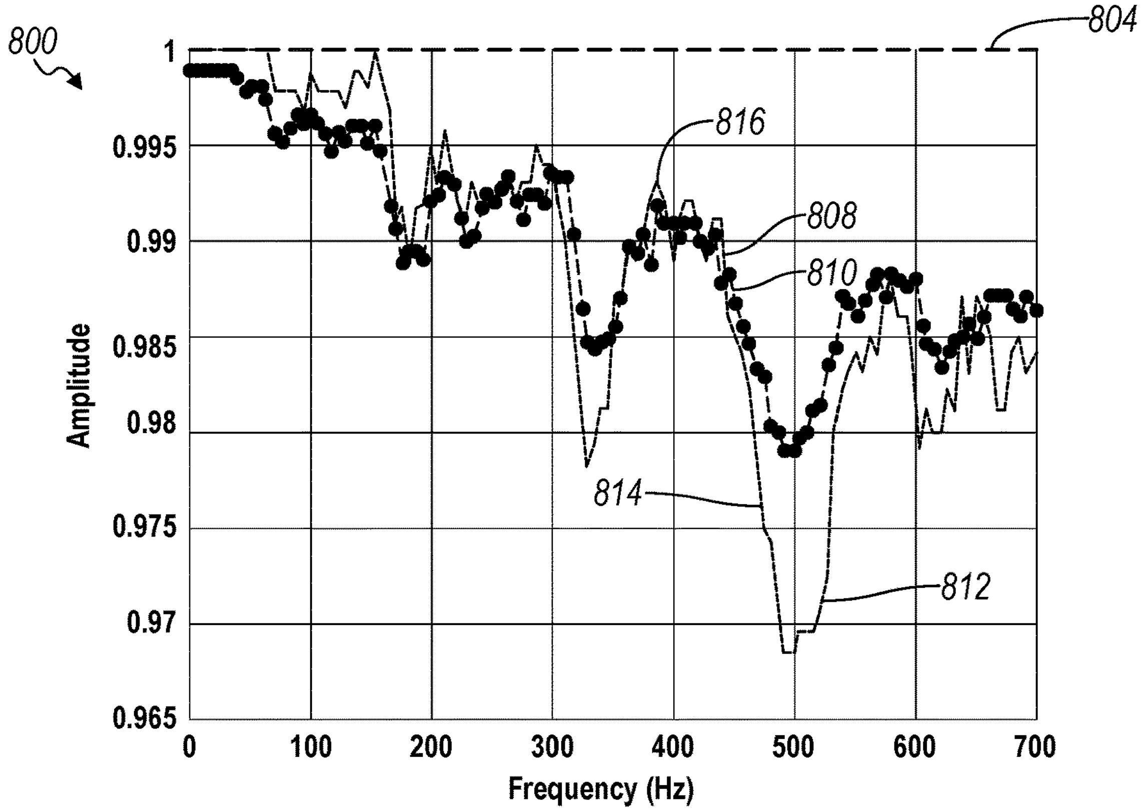
FIG. 8 is a graph further illustrating the frequency response of FIG. 6.

FIGS. 6-8 are graphs illustrating the impact of the method 500 when the ANC system 406 adjusts the step size parameter and/or the leakage parameter, as compared to an existing ANC system that does not adjust the step size parameter and/or the leakage parameter.

Figure 6A:
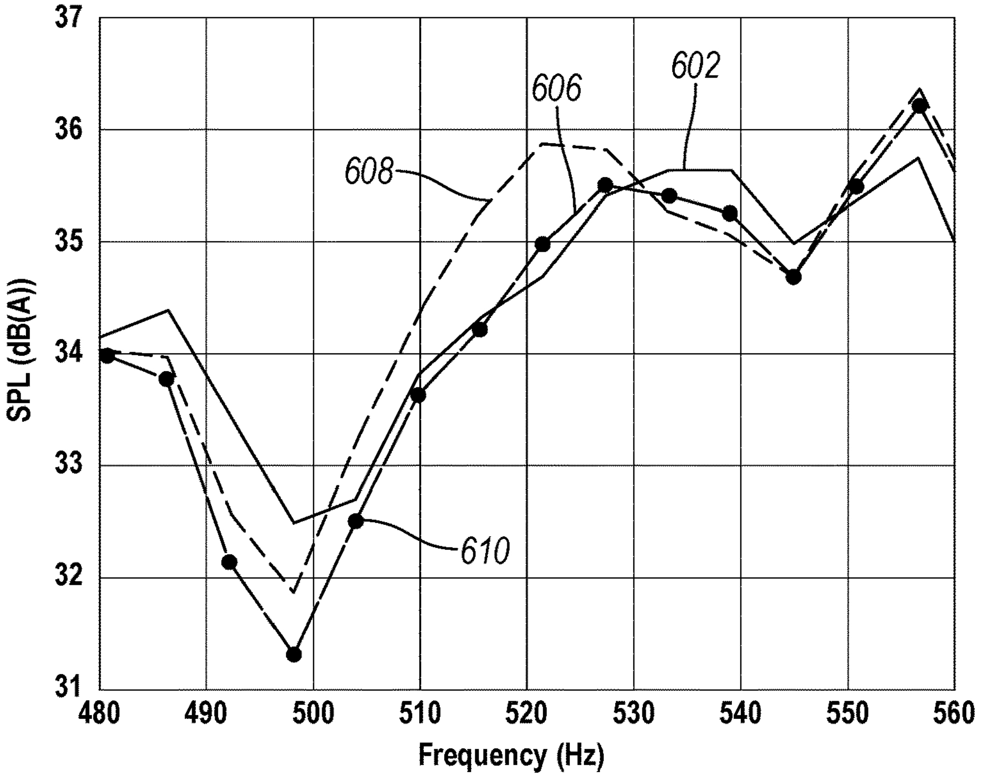
FIG. 6A is an enlarged view of a portion of FIG. 6.

FIG. 6 is a graph 600 that includes live curves 602, 604, 606, 608, 610 that illustrate the frequency response of sound pressure level measured within the vehicle at the location of the physical microphone 408 in decibels (dB). FIG. 6A is an enlarged view of a portion of the graph 600 between 480-560 Hz. The graph 600 includes a first curve 602 that illustrates sound measured when the ANC system 406 is off. The second curve 604 illustrates sound measured in the vehicle using an existing ANC system (not shown) that does not adjust the step size parameter nor the leakage parameter. The third curve 606 illustrates sound measured when the ANC system 406 is active and adjusting the step size parameter, but not the leakage parameter. The fourth curve 608 illustrates sound measured when the ANC system 406 is active and adjusting the leakage parameter, but not the step size parameter. The fifth curve 610 illustrates sound measured when the ANC system 406 is active and adjusting the step size parameter and the leakage parameter. The noise boosting shown in curve 604 is substantially lowered, or turned into noise cancellation, in curves 606, 608 and 610 by employing an ANC system such as 406 that automatically adjusts adaptation parameters.

FIG. 7 is a graph 700 that includes three curves 704, 706, and 710 that illustrate the frequency response of sound pressure level within the vehicle at the location of the physical microphone 408 in decibels (dB). The first curve 704 illustrates a constant (not adjusting) step size parameter of an existing ANC system (not shown). The second curve 706 illustrates the automatic adjustment of the step size parameter according to the method 500. The third curve 710 illustrates the automatic adjustment of the step size parameter and the leakage parameter according to the method 500.

FIG. 8 is a graph 800 including three curves 804, 808, 810 illustrating the frequency response of sound pressure level within the vehicle at the location of the physical microphone 408. The first curve 804 illustrates a constant (not adjusting) leakage parameter of an existing ANC system (not shown). The second curve 808 illustrates the automatic adjustment of the leakage parameter according to the method 500. The third curve 810 illustrates the automatic adjustment of the step size parameter and the leakage parameter according to the method 500.

Referring to FIGS. 6-6A, the third curve 606, the fourth curve 608, and the fifth curve 610, illustrate how the ANC system 406 switches between the Attack Mode, the Release Mode, and Normal Mode to limit noise boosting. The difference between the ANC on curves 606, 608, 610 and the ANC off curve 602 is indicative of the performance of each approach, where a small difference indicates higher performance. The third curve 606 (step size parameter adjustment) and the fifth curve 610 (step size and leakage parameter adjustment) overlap in the illustrated embodiment, which indicates that both approaches have similar performance within the illustrated frequency range. The second curve 604, which illustrates the performance of an existing ANC system, illustrates noise boosting at 480-540 Hz.

The Attack Mode is illustrated between 520-530 Hz where the three ANC on curves 606, 608, 610 are all greater than the ANC off curve 602. The ANC system 406 decreases the step size parameter and the leakage parameter in the Attack Mode to maintain stability and limit noise boosting. The difference between the fourth curve 608 (leakage parameter adjustment) and the first curve 602 (ANC off) is greater than the difference between the third curve 606 (step size parameter adjustment) and the first curve 602 (ANC off), which indicates that the step size parameter adjustment performs better than leakage parameter adjustment in this example in the Attack Mode.

The Release Mode is illustrated between 480-500 Hz where the three ANC on curves 606, 608, 610 are all less than the ANC off curve 602. The ANC system 406 increases the step size parameter and the leakage parameter in the Release Mode to maintain system performance. The difference between the fourth curve 608 (leakage parameter adjustment) and the first curve 602 (ANC off) is less than the difference between the third curve 606 (step size parameter adjustment) and the first curve 602 (ANC off), which indicates that the leakage parameter adjustment performs better than the step size parameter adjustment in the Release Mode. This is Release Mode because using the lowered step size, or leakage, or both step size and leakage in the Attack Mode, reduces or eliminates noise boosting, which results in noise cancellation. This means that the value of NRR is now greater than the noise threshold, and so the step size and/or leakage values are both incremented back upward.

The Normal Mode is illustrated between 400-460 Hz where the three ANC on curves 606, 608, 610 are all approximately equal to the ANC off curve 602. The ANC system 406 maintains $\delta_\gamma$ and/or $\delta_\mu$ at unity, to return the step size parameter and the leakage parameter at their nominal values in the Normal Mode to maintain system performance.

Referring to FIG. 7, the Attack Mode is illustrated between 520-530 Hz where the step size parameter is decreased and the step size curve 706 rises, as referenced by numeral 712, to maintain stability and limit noise boosting. The Release Mode is illustrated between 480-500 Hz where the step size parameter is increased and the step size curve 706 falls as referenced by numeral 714, to maintain system performance. The Normal Mode is illustrated between 400-460 Hz where the step size parameter does not change the step size curve 706 is generally flat as referenced by numeral 716.

With reference to FIG. 8, the Attack Mode is illustrated between 520-530 Hz where the leakage parameter is decreased and the leakage curve 808 rises as referenced by numeral 812, to maintain stability and limit noise boosting. The Release Mode is illustrated between 480-500 Hz where the leakage parameter is increased and the leakage curve 808 falls as referenced by numeral 814, to maintain system performance. The Normal Mode is illustrated between 400-460 Hz where the step size parameter does not change the leakage curve 808 is generally flat as referenced by numeral 816.

Figure 9:
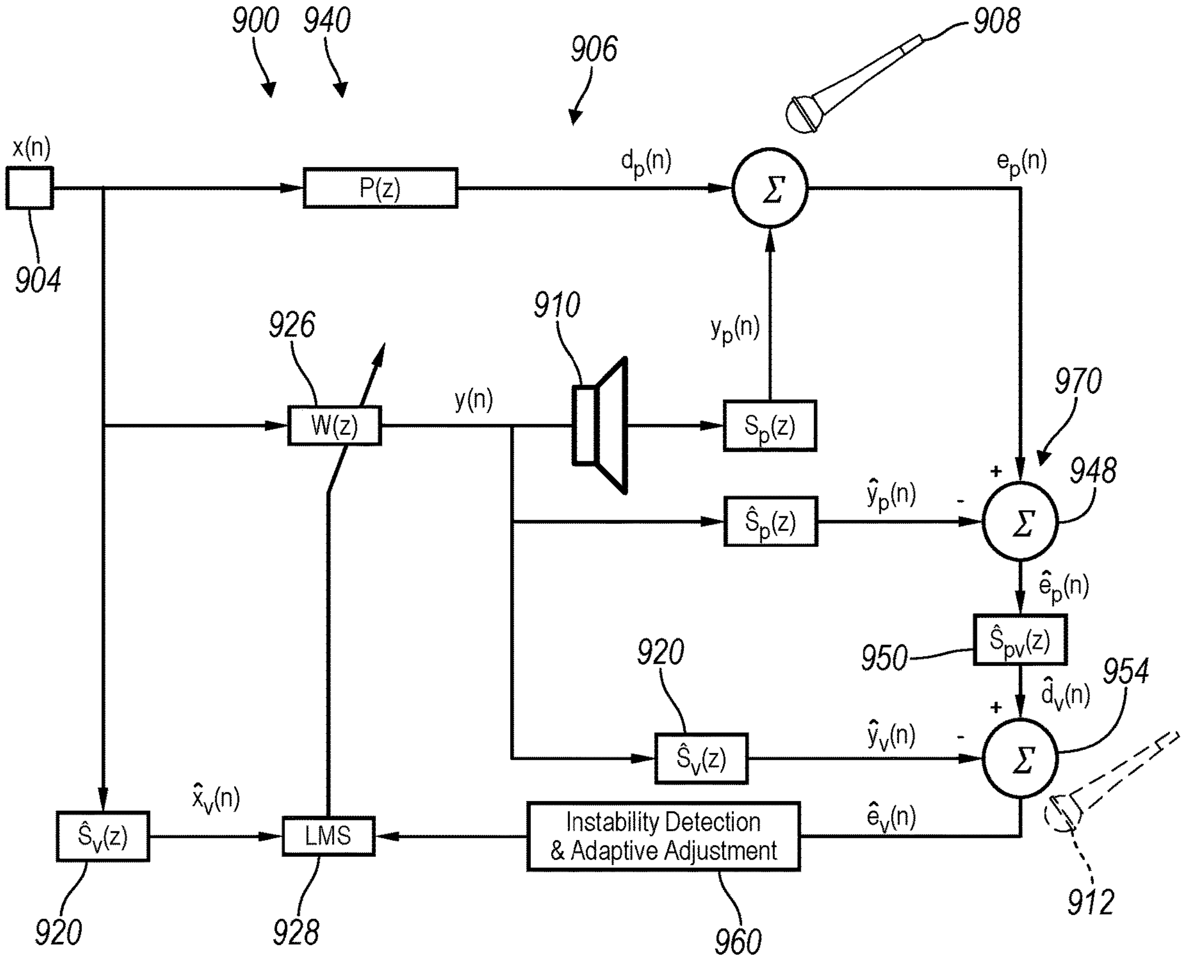
FIG. 9 is a schematic block diagram representing a virtual microphone ANC system, in accordance with one or more embodiments.

FIG. 9 is a schematic block diagram of a vehicle-based virtual microphone (VM) ANC system 906 showing adaptive filter block 428 that contains many of the key ANC system parameters that may be used to adjust w-filter parameters, such as step size and/or leakage to optimize ANC system performance. For ease of explanation, the VM ANC system 906 illustrated in FIG. 9 is shown with components and features of an RNC system 900 and an EOC system 940. Accordingly, the VM ANC system 906 is a schematic representation of an RNC and/or EOC system, such as those described in connection with FIGS. 1-4, featuring additional system components of the VM ANC system 906 including a virtual microphone 912 and a virtual microphone signal processing block 970. Similar components may be numbered using a similar convention.

For instance, similar to ANC system 406, the VM ANC system 906 may include a vibration sensor 904, a physical microphone 908, a w-filter 926, an adaptive filter controller 928, a secondary path filter 920, a loudspeaker 910, and an instability detection and adaptive adjustment signal processing block 960 consistent with operation of the vibration sensor 404, the physical microphone 408, the w-filter 426, the adaptive filter controller 428, the secondary path filter 420, the loudspeaker 410, and the additional signal processing block 460, respectively, discussed above. FIG. 9 also shows the primary path P(z) and secondary path S(z), as described with respect to FIG. 4, in block form for illustrative purposes. In the case of an EOC system 940, the vibration sensor 904 is replaced by an RPM sensor 342, lookup table 346, and frequency generator 348, as described above with reference to FIG. 3.

The virtual microphone 912 represents a microphone located at a virtual microphone location that would similarly sense all the sound at its virtual location, such as an estimate of the anti-noise signal in addition to the disturbance signal $d_v(n)$ to be cancelled, which includes road noise, engine, and exhaust noise, plus the anti-noise from the loudspeaker 910, and extraneous sounds. The pressure at the virtual microphone locations is estimated from the pressure at the physical microphone locations to form an estimated error signal $\hat{e}_v(n)$.

The VM ANC system 906 estimates the disturbance noise to be cancelled $\hat{e}_p(n)$ at the physical microphone location at block 948. The VM ANC system 906 subtracts an estimate of the anti-noise at the physical microphone location $\hat{y}_p(n)$ from the physical error signal $e_p(n)$ to estimate the disturbance noise at the physical microphone location $\hat{e}_p(n)$. The VM ANC system 906 then estimates the disturbance noise to be cancelled at the virtual microphone location $\hat{d}_v(n)$ at block 950 by convolving the estimated disturbance noise at the physical microphone location $\hat{d}_p(n)$ with the transfer function 950 between the physical and virtual microphone location $\hat{S}_{pv}(z)$. At block 954, the VM ANC system 906 estimates the virtual microphone error signal $\hat{e}_v(n)$ that would be present at the virtual microphone by subtracting an estimate of the anti-noise at this location $\hat{y}_v(n)$ from the estimated disturbance noise to be cancelled at the virtual microphone location $\hat{d}_v(n)$.

Although the ANC system is described with reference to a vehicle, the techniques described herein are applicable to non-vehicle applications. For example, a room may have fixed seats which define a listening position at which to quiet a disturbing sound using reference sensors, error sensors, loudspeakers and an LMS adaptive system. Note that the disturbance noise to be cancelled is likely of a different type, such as HVAC noise, or noise from adjacent rooms or spaces. Further, a room may have occupants whose position varies with time, and the seat sensors or head tracking techniques described herein must then be relied upon to determine the position of the listener or listeners so that the 3-dimensional location of the virtual microphones can be selected.

Although FIGS. 1, 3, 4, and 9 show LMS-based adaptive filter controllers 128, 328, 428, and 928, respectively, other methods and devices to adapt or create optimal controllable W-filters 126, 326, 426, and 926 are possible. For example, in one or more embodiments, neural networks may be employed to create and optimize W-filters in place of the LMS adaptive filter controllers. In other embodiments, machine learning or artificial intelligence may be used to create optimal W-filters in place of the LMS adaptive filter controllers.

Any one or more of the controllers or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof.

For example, the steps recited in any method or process claims may be executed in any order and are not limited to the specific order presented in the claims. Equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Further, functionally equivalent processing steps can be undertaken in either the time or frequency domain. Accordingly, though not explicitly stated for each signal processing block in the figures, the signal processing may occur in either the time domain, the frequency domain, or a combination thereof. Moreover, though various processing steps are explained in the typical terms of digital signal processing, equivalent steps may be performed using analog signal processing without departing from the scope of the present disclosure Benefits, advantages and solutions to problems have been described above with regard to particular embodiments. However, any benefit, advantage, solution to problems or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments.

What is claimed is:

1. An active noise cancellation (ANC) system comprising:
- at least one loudspeaker to project anti-noise sound within a passenger cabin of a vehicle in response to receiving an anti-noise signal;
- at least one microphone to provide an error signal indicative of noise and the anti-noise sound within the passenger cabin;
- an adaptive filter controller programmed to:
- filter the error signal to obtain a noise reduction ratio, and adjust a step size parameter based on a comparison of the noise reduction ratio to a noise threshold; and
- a controllable filter to generate the anti-noise signal based on the adjusted step size parameter, and
- wherein the adaptive filter controller is further programmed to:
  - filter the error signal using a transfer function to obtain an estimated virtual microphone error signal; and
  - filter the estimated virtual microphone error signal to obtain the noise reduction ratio.

2. The ANC system of claim 1, wherein the adaptive filter controller is further programmed to:
- detect an occurrence of noise boosting based on the comparison of the noise reduction ratio to the noise threshold; and
- decrease the step size parameter in response to detection of noise boosting.

3. The ANC system of claim 1, wherein the adaptive filter controller is further programmed to decrease the step size parameter in response to the noise reduction ratio being less than or equal to the noise threshold.

4. The ANC system of claim 1, wherein the adaptive filter controller is further programmed to increase the step size parameter in response to the noise reduction ratio being greater than the noise threshold, and an automatic tuning step size parameter being less than a minimum step size parameter.

5. The ANC system of claim 1, wherein the adaptive filter controller is further programmed to maintain the step size parameter in response to the noise reduction ratio being greater than the noise threshold, and an automatic tuning step size parameter being greater than a minimum step size parameter.

6. The ANC system of claim 1, wherein the adaptive filter controller is further programmed to adjust the step size parameter and a leakage parameter based on the comparison of the noise reduction ratio to the noise threshold.

7. The ANC system of claim 6, wherein the adaptive filter controller is further programmed to decrease the step size parameter and the leakage parameter in response to the noise reduction ratio being less than or equal to the noise threshold.

8. The ANC system of claim 6, wherein the adaptive filter controller is further programmed to:
- increase the step size parameter in response to the noise reduction ratio being greater than the noise threshold, and an automatic tuning step size parameter being less than a minimum step size parameter; and
- increase the leakage parameter in response to the noise reduction ratio being greater than the noise threshold, and an automatic tuning leakage parameter being less than a minimum leakage parameter.

9. The ANC system of claim 6, wherein the adaptive filter controller is further programmed to:
- maintain the step size parameter in response to the noise reduction ratio being greater than the noise threshold, and an automatic tuning step size parameter being greater than a minimum step size parameter; and
- maintain the leakage parameter in response to the noise reduction ratio being greater than the noise threshold, and an automatic tuning leakage parameter being greater than a minimum leakage parameter.

10. The ANC system of claim 6, wherein the adaptive filter controller is further programmed to:
- compare a frequency of the error signal to a frequency threshold value;
- adjust the step size parameter in response to the frequency of the error signal being greater than the frequency threshold value; and adjust the leakage parameter in response to the frequency of the error signal being less than the frequency threshold value.

11. An active noise cancellation (ANC) system comprising:

at least one loudspeaker to project anti-noise sound within a passenger cabin of a vehicle in response to receiving an anti-noise signal; and a controller configured to:

filter an error signal indicative of noise and the anti-noise sound within the passenger cabin to obtain a noise reduction ratio, adjust a step size parameter and a leakage parameter based on a comparison of the noise reduction ratio to a noise threshold, generate the anti-noise signal based on the adjusted step size parameter and the adjusted leakage parameter, detect an occurrence of noise boosting based on the comparison of the noise reduction ratio to the noise threshold, and decrease at least one of the step size parameter and the leakage parameter in response to detection of noise boosting.

12. The ANC system of claim 11, wherein the controller is further configured to detect the occurrence of noise boosting in response to the noise reduction ratio being less than or equal to the noise threshold.

13. The ANC system of claim 11, wherein the controller is further configured to:

detect an occurrence of no noise boosting based on the comparison of the noise reduction ratio to the noise threshold;

increase the step size parameter in response to detection of no noise boosting and an automatic tuning step size parameter being less than a minimum step size parameter; and increase the leakage parameter in response to detection of no noise boosting and an automatic tuning leakage parameter being less than a minimum leakage parameter.

14. The ANC system of claim 13, wherein the controller is further configured to detect the occurrence of no noise boosting in response to the noise reduction ratio being greater than the noise threshold.

15. A method for controlling stability in an active noise cancellation (ANC) system, the method comprising:

receiving an error signal from a microphone indicative of noise and anti-noise sound within a passenger cabin;

filtering the error signal to obtain a noise reduction ratio;

detecting an occurrence of noise boosting based on a comparison of the noise reduction ratio to a noise threshold;

decreasing a step size parameter in response to detection of noise boosting;

generating an anti-noise signal, to be radiated from a loudspeaker within the passenger cabin as the anti-noise sound, based on the decreased step size parameter;

detecting an occurrence of no noise boosting based on the comparison of the noise reduction ratio to the noise threshold;

increasing the step size parameter in response to detection of no noise boosting; and generating the anti-noise signal based on the increased step size parameter.

16. The method of claim 15, further comprising detecting the occurrence of noise boosting in response to the noise reduction ratio being less than or equal to the noise threshold.

17. The method of claim 15, further comprising detecting the occurrence of no noise boosting in response to the noise reduction ratio being greater than the noise threshold.

* * * * *